(12) United States Patent
Kim et al.

(10) Patent No.: US 9,398,499 B2
(45) Date of Patent: Jul. 19, 2016

(54) TERMINAL AND METHOD FOR SWITCHING BETWEEN RADIO ACCESS TECHNOLOGIES

(71) Applicant: Pantech Co., Ltd., Seoul (KR)

(72) Inventors: Jong Yeob Kim, Seoul (KR); Kyung Beom Kim, Seoul (KR)

(73) Assignee: Pantech Co., Ltd., Seoul (KR)

( * ) Notice: Subject to any disclaimer, the term of this patent is extended or adjusted under 35 U.S.C. 154(b) by 248 days.

(21) Appl. No.: 13/653,969

(22) Filed: Oct. 17, 2012

(65) Prior Publication Data

US 2013/0287002 A1 Oct. 31, 2013

(30) Foreign Application Priority Data

Apr. 26, 2012 (KR) ........................ 10-2012-0043688

(51) Int. Cl.
*H04W 36/00* (2009.01)
*H04W 76/06* (2009.01)
*H04W 36/16* (2009.01)
*H04W 36/34* (2009.01)
*H04W 36/14* (2009.01)

(52) U.S. Cl.
CPC ...... *H04W 36/0066* (2013.01); *H04W 36/0022* (2013.01); *H04W 36/14* (2013.01); *H04W 36/16* (2013.01); *H04W 36/34* (2013.01); *H04W 76/06* (2013.01); *H04W 76/068* (2013.01)

(58) Field of Classification Search
None
See application file for complete search history.

(56) References Cited

U.S. PATENT DOCUMENTS

| 2009/0086667 | A1* | 4/2009 | Sitomaniemi et al. | 370/328 |
|---|---|---|---|---|
| 2010/0317347 | A1* | 12/2010 | Burbidge et al. | 455/436 |
| 2011/0222509 | A1* | 9/2011 | Lee | 370/331 |
| 2011/0268109 | A1* | 11/2011 | Miyata | 370/352 |
| 2013/0070728 | A1* | 3/2013 | Umatt et al. | 370/331 |
| 2013/0279442 | A1* | 10/2013 | Tiwari | 370/329 |
| 2014/0146792 | A1* | 5/2014 | Andre-Jonsson et al. | 370/331 |

OTHER PUBLICATIONS

3GPP TS 23.272 V11.1.0, 3rd Generation Partnership Project; Technical Specification Group Services and System Aspects; Circuit Switched (CS) fallback in Evolved Packet System (EPS); Stage 2 (Release 11), dated Jun. 2012.

* cited by examiner

*Primary Examiner* — Joshua A Kading
(74) *Attorney, Agent, or Firm* — H.C. Park & Associates, PLC

(57) ABSTRACT

A method includes determining whether a packet switched (PS) signaling connection is released, the PS signaling connection being associated with a first network corresponding to a first radio access technology (RAT), controlling a switching timing to a second network corresponding to a second RAT according to a type of the PS signaling connection, and transmitting a request for switching to the second network. A terminal includes a controller to determine whether a packet switched (PS) signaling connection is released, the PS signaling connection being associated with a first network corresponding to a first radio access technology (RAT), and to control a switching timing to a second network corresponding to a second RAT according to a type of the PS signaling connection, and a transmitter to transmit a request for switching to the second network.

19 Claims, 11 Drawing Sheets

TERMINAL AND METHOD FOR SWITCHING BETWEEN RADIO ACCESS TECHNOLOGIES

CROSS-REFERENCE TO RELATED APPLICATION

This application claims priority from and the benefit under 35 U.S.C. §119(a) of Korean Patent Application No. 10-2012-0043688, filed on Apr. 26, 2012, which is hereby incorporated by reference for all purposes as if fully set forth herein.

BACKGROUND

1. Field

The following disclosure relates to a terminal and method for switching between radio access technologies.

2. Discussion of the Background

A circuit switched fallback (CSFB) technique may be used to process a circuit switched call by switching from a long-term evolution (LTE) network to a 3rd generation (3G) network or to a 2nd generation (2G) network if the circuit switched call is requested while connecting to the LTE network, and reverting to the LTE network if the circuit switched call is terminated. The circuit switched call using the CSFB procedure (CSFB call) may be processed by enabling fallback from the LTE network to the 3G/2G network for switching between radio access technologies (RATs). This may involve a procedure of registering a location of a terminal in the 3G/2G network. The subsequent switching back to the LTE network may be executed based on LTE redirection information included in a 3G radio resource control (RRC) connection release message.

FIG. 1 is a diagram illustrating a process of transitioning to a long-term evolution (LTE) network using LTE redirection information after terminating a circuit switched fallback (CSFB) call. Referring to FIG. 1, a user equipment or mobile station (UE/MS) 101 supporting LTE communication protocols may request a CSFB call, and may release RRC connection from a LTE network 103 by receiving a RRC connection release message from the LTE network 103. The UE/MS 101 may perform a CSFB call process after making a transition to a circuit switched network, such as a wideband code division multiple access (WCDMA) network 105. After terminating the CSFB call and releasing the RRC connection with the circuit switched network, the UE/MS 101 may receive redirection information ("redirection info") to switch back to the LTE network 103. Hereinafter, the UE/MS 101 may be referred to as a terminal or a mobile terminal.

The LTE redirection information may be used for the switching back from the 3G wideband code division multiple access (WCDMA) network to a 4th generation (4G) LTE network.

However, few networks supporting a 3G RRC connection release message with LTE redirection information in a 3G network exist for various reasons. For example, if a packet switched session for a data communication exists, the redirection information is not sent until the PS session is terminated. Accordingly, suggestions have been made to develop a system architecture supporting a fast return to an LTE network from a 3G network to an LTE network without waiting for normal termination of a packet switched (PS) session.

However, in the fast return scheme, if a packet switched (PS) session is found in a process of closing sessions after processing a call, a terminal supporting the fast return to an LTE scheme may transmit a signaling connection release indication (SCRI) message to a network to close the corresponding PS session. After the PS session is closed, the terminal may execute a transition to an LTE network.

In the fast return scheme, however, the terminal may transmit the SCRI message to close an active PS session while waiting for a response for a routing area updating request, thereby the terminal may attempt a transition to the LTE network without receiving the response for the routing area updating request. In this instance, since a context of switching between RATs may not be successfully transferred, the location registration in an LTE network may fail and voice call and data communication failures may occur until a successful location registration in the LTE network.

The above information disclosed in this Background section is only for enhancement of understanding of the background of the invention and therefore it may contain information that does not form any part of the prior art nor what the prior art may suggest to a person of ordinary skill in the art.

SUMMARY

The following description relates to a terminal and method for switching between radio access technologies.

Additional features of the invention will be set forth in the description which follows, and in part will be apparent from the description, or may be learned by practice of the invention.

Exemplary embodiments of the present invention provide a method for switching between radio access technologies (RATs) for a terminal including determining whether a packet switched (PS) signaling connection is released, the PS signaling connection being associated with a first network corresponding to a first radio access technology (RAT), controlling a switching timing to a second network corresponding to a second RAT according to a type of the PS signaling connection, and transmitting a request for switching to the second network.

Exemplary embodiments of the present invention provide a method for switching between radio access technologies (RATs) for a terminal including determining a status of a packet switched (PS) signaling connection associated with a first network corresponding to a first radio access technology (RAT), controlling a transmission of a signaling connection release indication (SCRI) message to the first network based on the status of the PS signaling connection, and transmitting a request for switching to a second network corresponding to a second RAT depending upon the transmission of the SCRI message.

Exemplary embodiments of the present invention provide a terminal for switching between radio access technologies (RATs) including a controller to determine whether a packet switched (PS) signaling connection is released, the PS signaling connection being associated with a first network corresponding to a first radio access technology (RAT), and to control a switching timing to a second network corresponding to a second RAT according to a type of the PS signaling connection, and a transmitter to transmit a request for switching to the second network.

It is to be understood that both forgoing general descriptions and the following detailed description are exemplary and explanatory and are intended to provide further explanation of the invention as claimed. Other features and aspects will be apparent from the following detailed description, the drawings, and the claims.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the principles of the invention.

DETAILED DESCRIPTION OF THE ILLUSTRATED EMBODIMENTS

Figure 1:
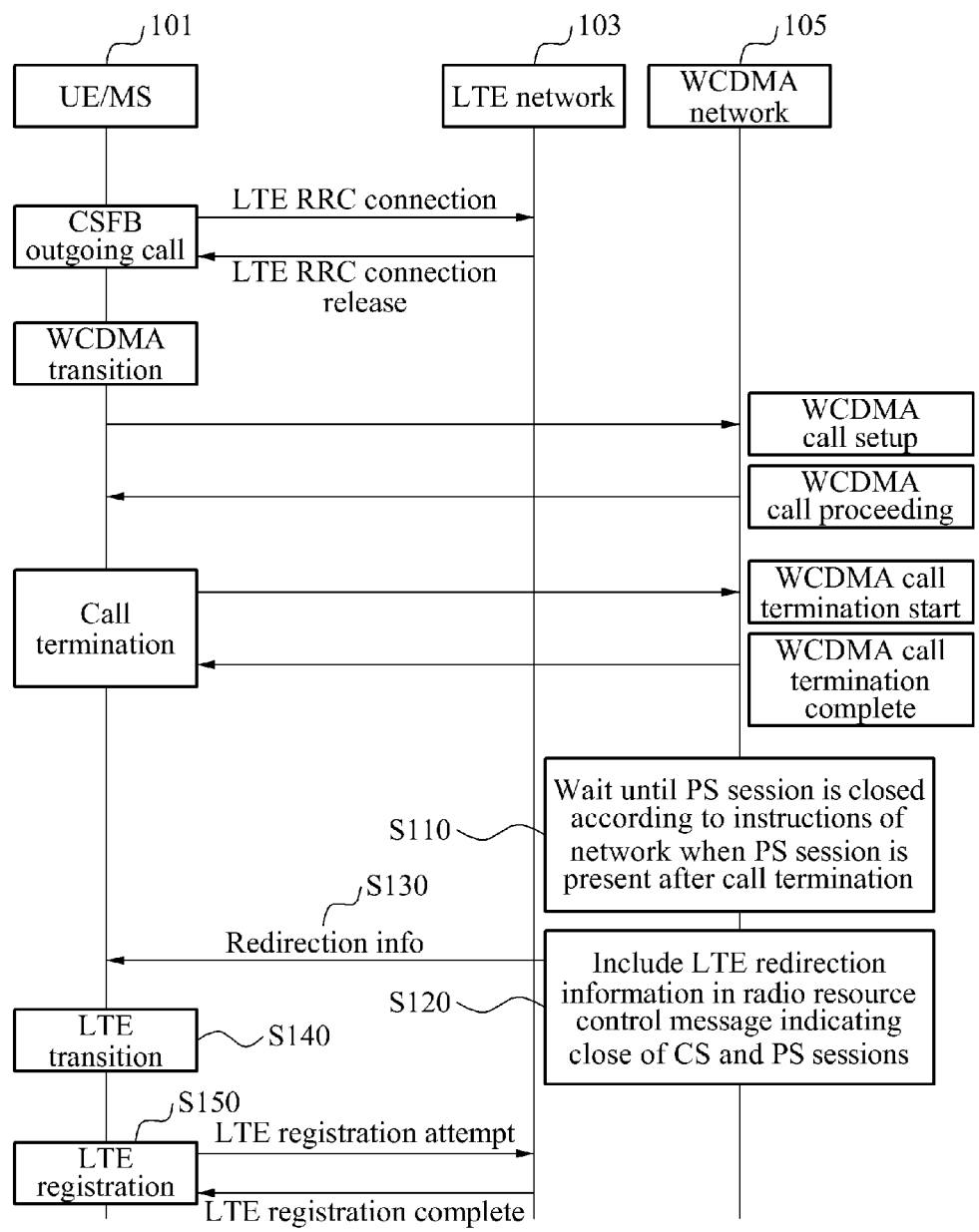
FIG. 1 is a diagram illustrating a process of transitioning to a long-term evolution (LTE) network using LTE redirection information after terminating a circuit switched fallback (CSFB) call.

The invention is described more fully hereinafter with reference to the accompanying drawings, in which exemplary embodiments of the invention are shown. This invention may, however, be embodied in many different forms and should not be construed as limited to the embodiments set forth herein. Rather, these exemplary embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element is referred to as being "connected to" another element, it can be directly connected to the other element, or intervening elements may be present.

Figure 2:
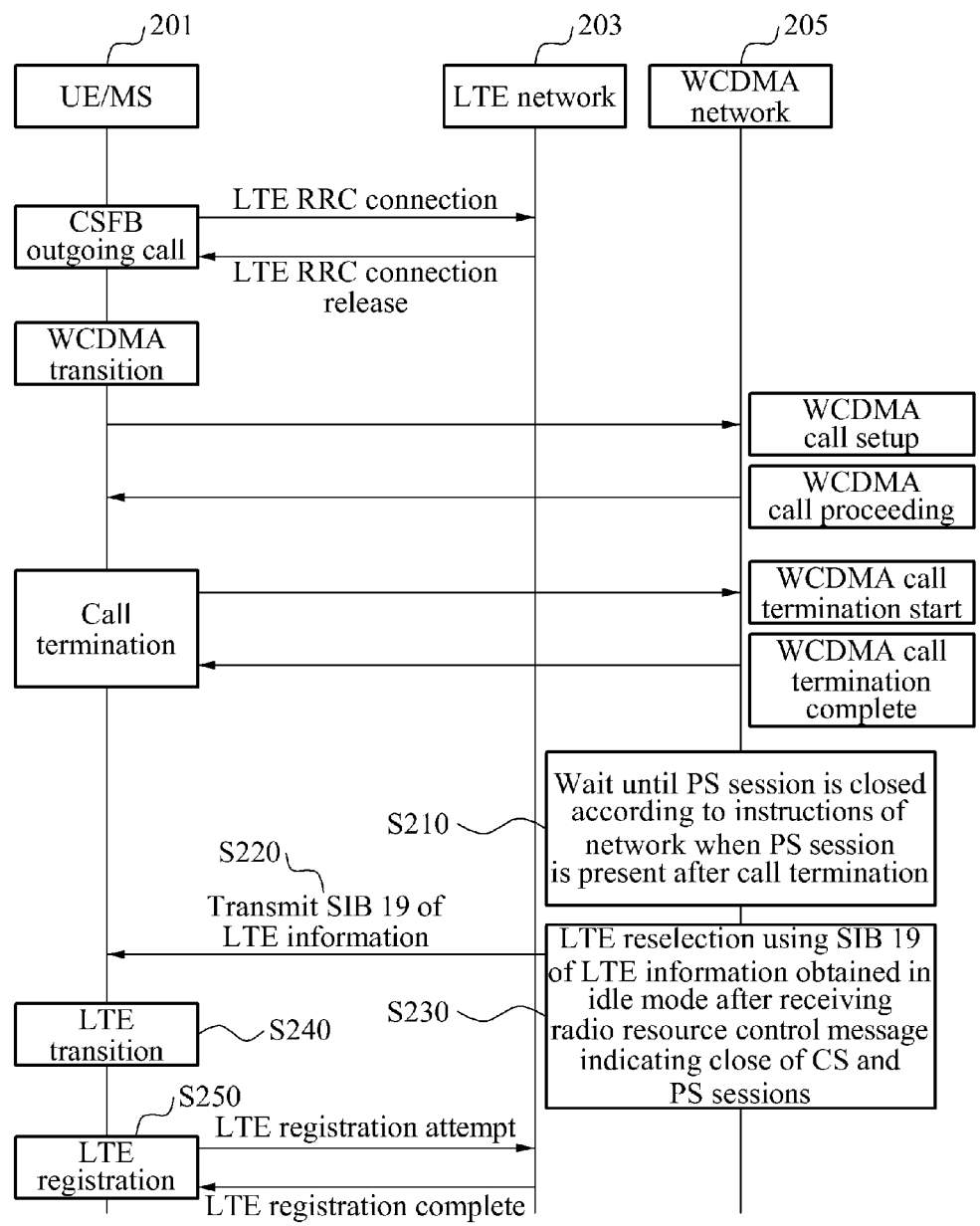
FIG. 2 is a diagram illustrating a process of transitioning to an LTE network using system information block (SIB) 19 information after terminating a CSFB call.

FIG. 1 is a diagram illustrating a process of transitioning to a long-term evolution (LTE) network using LTE redirection information after terminating a circuit switched fallback (CSFB) call, and FIG. 2 is a diagram illustrating a process of transitioning to an LTE network using system information block (SIB) 19 information after terminating a CSFB call.

As shown in FIG. 1 and FIG. 2, a user equipment or mobile station (UE/MS) 101 and 201 may perform a circuit switched fallback procedure switching from all-IP-based packet switched network, such as the LTE network 103 and 203, to a hybrid type network including a circuit switched network and a packet switched network, such as the WCDMA network 105 and 205. In a circuit switched fallback procedure, the UE/MS 101 and 201 may perform a circuit switched call by switching to a circuit switched network, such as a 3G network including WCDMA networks 105 and 205, from a packet switched network, such as an LTE network 103 and 203, and, if the circuit switched call is terminated, the UE/MS 101 and 201 may perform switching back to the LTE network. The UE/MS 201 may be referred to as a terminal or a mobile terminal.

Referring to FIG. 1, in the process of switching from the 3G network back to the LTE network, the switching back may be executed based on LTE redirection information (Redirection info) transmitted with a radio resource control (RRC) message, as shown in operation S130 of FIG. 1.

If a packet switched (PS) session is still open after the circuit switched call is terminated in the 3G network, in operation S110, the circuit switched network may wait until the PS session is closed before transmitting the redirection info. The circuit switched network may include LTE redirection information in an RRC message indicating that circuit switched (CS) session and PS session are closed in operation S120, and may transmit the message with LTE redirection information to the UE/MS 101 in operation S130. The transition to the LTE network 103 may be executed using the received LTE redirection information in operation S140, and LTE registration may be executed in operation S150.

Referring to FIG. 2, after a CSFB call is terminated in a 3G network, such as the WCDMA network 205, the UE/MS 201 may be in an idle state in the 3G network and system information for switching back to the LTE network 203 may be obtained in operation S210 if a packet switched session is closed. Among the 3G system information, system information block 19 (SIB 19) containing Inter-RAT (radio access technology) frequency and priority information may be transmitted to the UE/MS 201 in operation S220. The radio access technology (RAT) may indicate a radio technology that enables a wireless communication terminal to access a core network via a wireless channel. Examples of the RAT include Global System for Mobile communication (GSM), Universal Mobile Communication System (UMTS) Terrestrial Radio Access Network (UTRAN), Evolved UTRAN (eUTRAN), and the like, but aspects are not limited thereto. The UE/MS 201 may execute an LTE reselection based on the system information, SIB 19, in operation S230. The transition to the LTE network 203 may be executed based on the received 3G system information, SIB 19, in operation S240, and LTE registration may be executed in operation S250.

According to the process shown in FIG. 2, an LTE signal strength may be measured at a determined cycle in an idle state in the 3G network, and transitioning to the LTE network may be executed if the signal strength is higher than a threshold value set in SIB 19.

Thus, after a call is terminated, operations of obtaining SIB 19 system information in an idle state in 3G, measuring an LTE signal strength, and verifying whether the signal strength is higher than the threshold value are performed. Furthermore, as shown in FIG. 1 and FIG. 2, the switching back procedure is delayed until a PS session associated with the WCDMA network 205 is closed. Accordingly, transitioning from the 3G network to the LTE network may be delayed.

Figure 3:
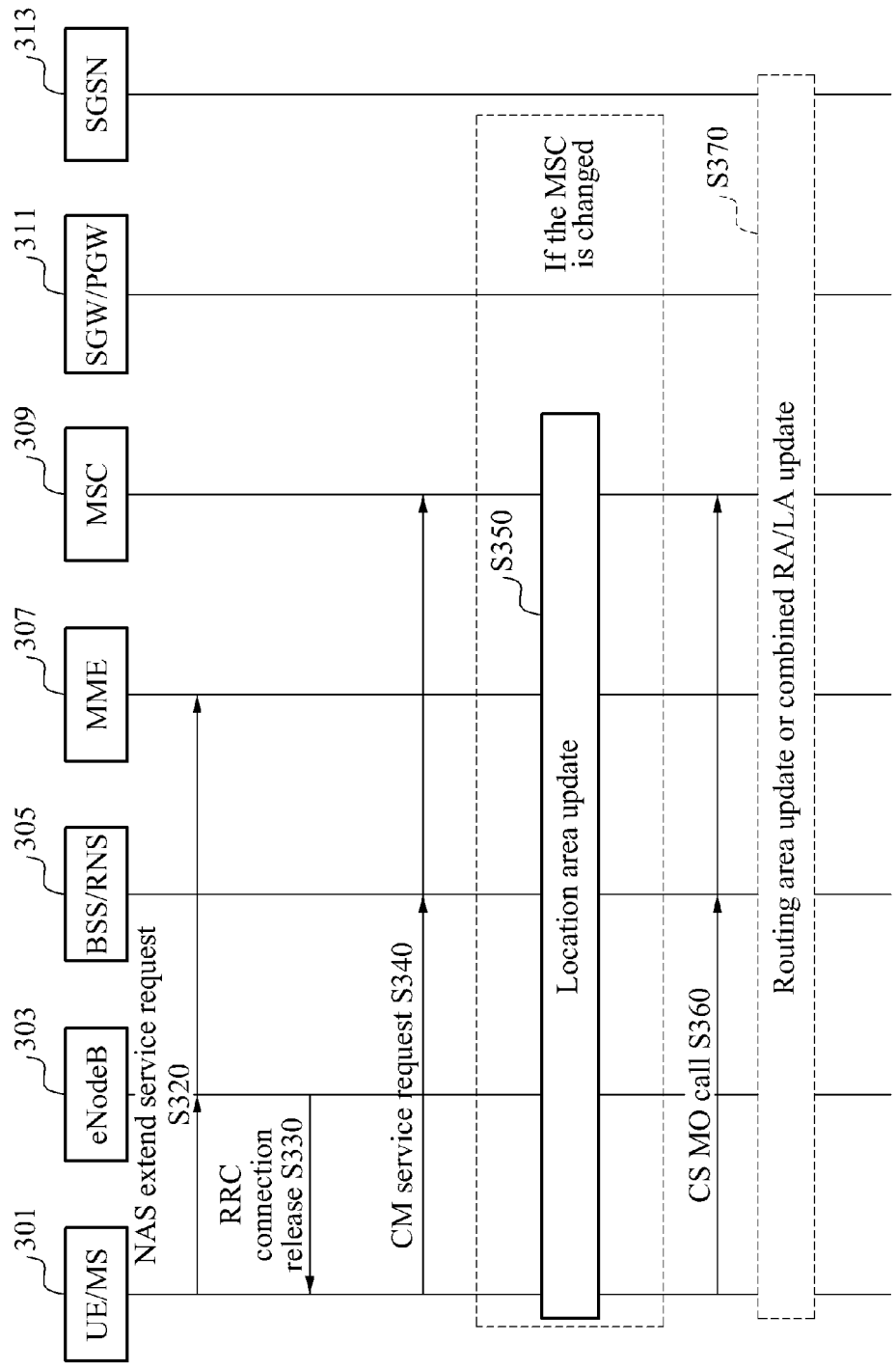
FIG. 3 is a diagram illustrating a process of performing a CSFB call according to a related art.

FIG. 3 is a diagram illustrating a process of performing a CSFB call according to a related art.

Referring to FIG. 3, the call processing procedure for a CSFB call may be performed via a user equipment (UE)/a mobile station (MS) 301, and a network including an evolved NodeB (eNodeB) 303, a base station subsystem (BSS)/a radio network subsystem (RNS) 305, a mobility management entity (MME) 307, a message switching center (MSC) 309, a serving gateway (SGW)/a packet data network gateway (PGW) 311, and a serving general packet radio service support node (SGSN) 313.

Hereinafter, the CSFB call processing procedure is described through a signaling message flow between the UE/MS 301 and the network, including call request of an evolved universal mobile telecommunications system terrestrial radio access network (E-UTRAN) system in LTE and call processing of GERAN/UTRAN in WCDMA. GERAN is an abbreviation for a global system for mobile communications (GSM)/enhanced data rates for global evolution (EDGE).

If a CSFB call is attempted by the UE/MS 301 after transitioning to a 3G system, for example, WCDMA, or to a second generation (2G) system, for example, GSM, the call may be processed in the 3G/2G network through operations S340, S350, S360, and S370. According to a CSFB call processing procedure, if a call is requested by the UE/MS 301 after transitioning to a 3G/2G network, a connection management (CM) service request message for the call is transmitted in operation S340, and a procedure for location registration in the 3G/2G network is performed.

The UE/MS 301 may transmit an extended service request (ESR) message to the MME 307 in operation S320. The ESR message may correspond to a message that the UE/MS 301 transmits to the MME 307 in response to a paging indication received from the MME 307.

In operation S330, the eNodeB 303 may transmit an LTE radio resource control (RRC) release message to the UE/MS 301 to perform an inter-RAT cell change for fallback to 3G/2G network so that the call may be processed in the 3G/2G network. The inter-RAT cell change may include cell change and cell reselection for the UE/MS 301 when a mobile station is connected to a network.

In operation S340, if a transition to the 3G (e.g., WCDMA)/2G (e.g., GSM) system is performed for transitioning to a circuit switched network, the UE/MS 301 may continue a call setup process by transmitting the CM service request message to the MSC 309.

In operation S350, if it is determined that a location area code (LAC) is changed, the UE/MS 301 may attempt location registration for a circuit switched (CS) domain through a location update request message. If it is determined that the LAC is not changed in operation 350, location update request message may not be transmitted.

Generally, a service area of a cellular wireless communication network may be divided into location areas, and each location area may include at least one radio cell. A unique number, also known as a location area code (LAC), may be assigned to each location area in the network. The LAC may be used as unique reference information for recognizing a location of a mobile subscriber, such as the UE/MS 301, and for connecting an incoming call to the mobile subscriber.

In operation S360, the UE/MS 301 may continue the call processing procedure regardless of the result of location registration attempted in operation 350. In operation S370, the UE/MS 301 may perform a procedure for location registration for a PS domain during the call processing. As shown in the signaling message flow of FIG. 3, since the CSFB call processing is performed by switching between RATs, the procedure for location registration may be executed during the CSFB call processing.

Figure 4:
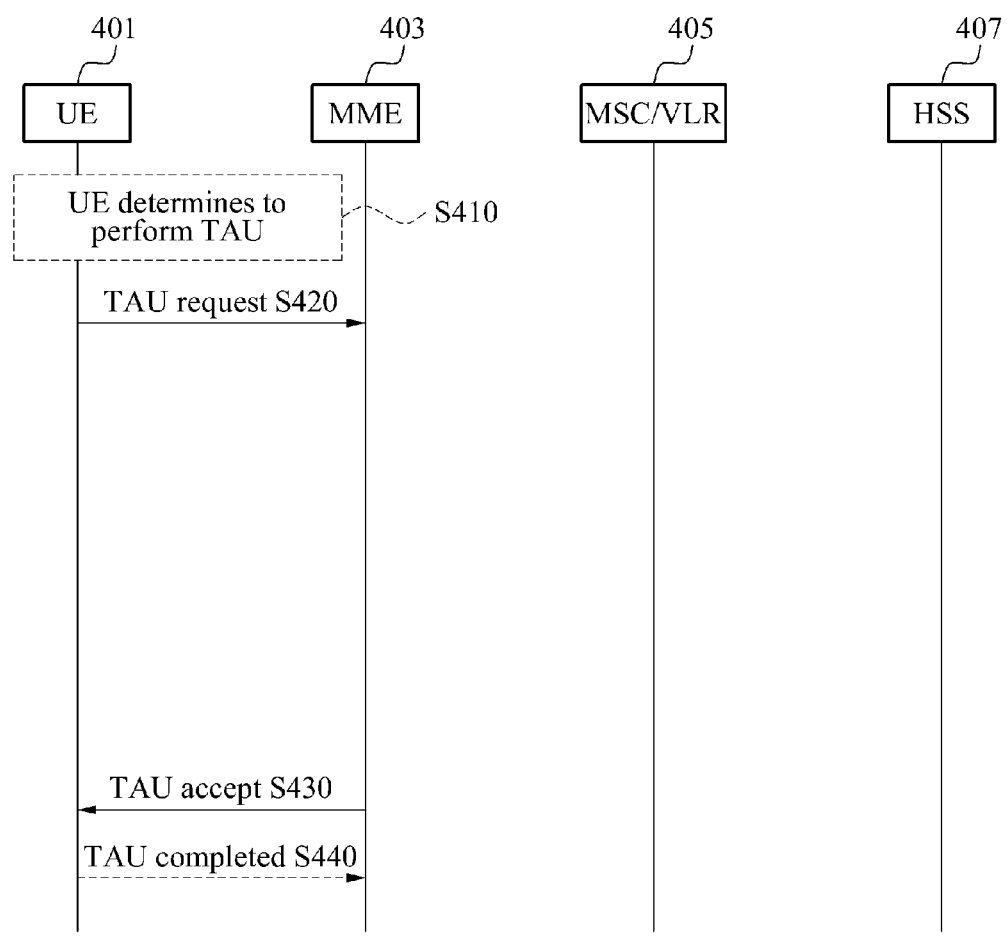
FIG. 4 is a diagram illustrating a process of performing a location registration after termination of a CSFB call and transitioning to an LTE network according to a related art.

FIG. 4 is a diagram illustrating a process of performing a location registration after termination of the CSFB call and transitioning to an LTE network according to a related art. Referring to FIG. 4, an LTE system may include a UE 401, an MME 403, an MSC/a visitor location register (VLR) 405, and a home subscriber server (HSS) 407.

To perform the procedure for location registration in the LTE system, the UE 401 may transmit a tracking area update (TAU) request message to the MME 403 and receive a TAU accept message from the MME 403 in response to the TAU request for subsequent incoming and outgoing call attempts and data access attempts. A tracking area (TA) may refer to a unit area indicating a plurality of adjacent eNodeBs defined as one group, and the UE may perform a periodic updating by transmitting information about a TA in which the UE is currently located, to the eNodeB, even in an idle state.

After a CSFB call is terminated, a transition to the LTE system may be performed by switching between RATs as described in operation S240 of FIG. 2, and the procedure for location registration in the LTE system may be executed as described in operation 250 of FIG. 2. FIG. 3 illustrates the procedure for location registration through a signaling message flow between the UE 401 and the LTE network.

Referring to FIG. 4, if the transition to the LTE system is executed after the termination of the CSFB call, the UE 401 may determine whether to perform a location registration process in the LTE network in operation S410.

The UE 401 may transmit a TAU request message to the MME 403 based on the determination result in operation S420.

The MME 403 may transmit a TAU accept message to the UE 401 in response to the TAU request in operation S430. The UE 401 may complete the procedure for location registration by transmitting a TAU complete message to the MME 403 in operation S440.

Figure 5:
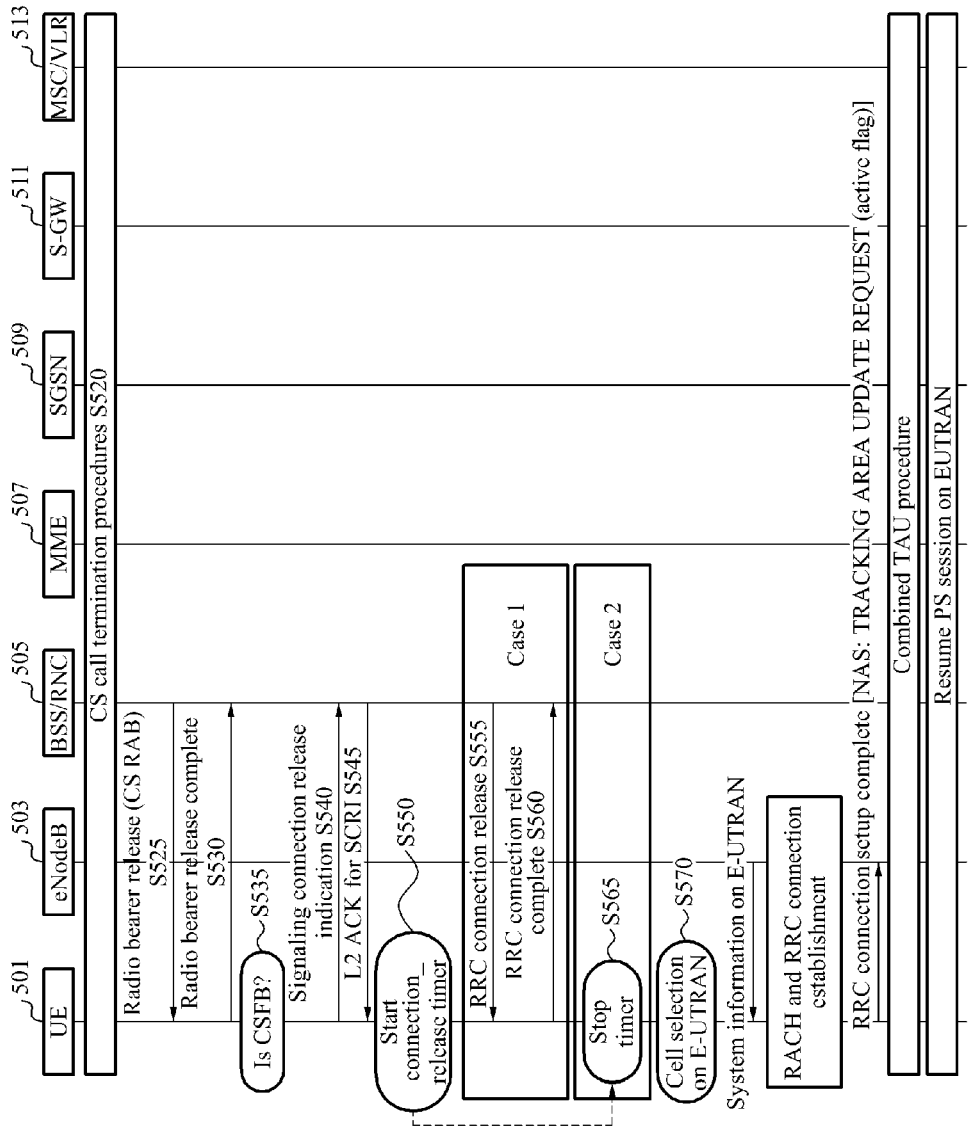
FIG. 5 is a diagram illustrating a process of transitioning to an LTE network using a fast return scheme.

FIG. 5 is a diagram illustrating a process of transitioning to an LTE network using a fast return to LTE scheme.

According to the switching back procedures shown in FIG. 1 and FIG. 2, transitioning to an LTE network may be delayed, if a PS session for data is open, until the PS session is closed according to instructions of the network.

To address this issue, the process illustrated in FIG. 5 suggests a switching back procedure based on a fast return to LTE scheme to enable a fast transition to LTE network after a call is terminated in a circuit switched network.

For a fast transition to an LTE network, the network may include a UE 501, an eNodeB 503, a BSS/RNC 505, an MME 507, an SGSN 509, an SGW 511, and an MSC/VLR 513, and an operational flow based on the fast return scheme is described in detail. Referring to FIG. 5, after terminating a CSFB call procedure in operation S520, the BSS/RNC 505 may transmit a radio bearer release message (CS RAB) to the UE 501, and the UE 501 may transmit a radio bearer release complete message to the BSS/RNC 505 in operations S525 and S530, respectively. The UE 501 may determine whether the terminate call is a CSFB call in operation S535. If the terminated call is determined to be a CSFB call and a PS signaling connection exists in the 3G/2G network, the UE 501 may enable transmission of a signaling connection release indication (SCRI) message for a PS domain to close a PS session when the PS session is open after a CSFB call is terminated. The UE 501 may receive Layer 2 Acknowledgement (L2 Ack) in response to the SCRI in operation S545.

If no sessions are open in CS and PS domains or if the L2 Ack is received by the UE 501, an RRC connection release message may be transmitted from the BSS/RNC 505 in operation S555. Further, the UE 501 may start a connection release timer (CRT) in operation S550 if the L2 Ack is received. If the UE 501 receives the RRC connection release message, the UE 501 may execute a transition to an LTE network using LTE system information obtained before. Accordingly, even though the UE 501 does not receive LTE redirection information from the network, the UE 501 may make a determination and may perform a transition to the LTE network using LTE system information.

The radio bearer release message may correspond to a message that the BSS/RNC 505 transmits to the UE 501 to release a connection of a physical channel after termination of the call. If the radio bearer is released, the physical channel may be changed or released based on whether the radio bearer can be reused after the release of the radio bearer.

As described above, if the terminated CS call is determined to be a CSFB call in operation S535 and a PS signaling connection exists, the UE 501 may transmit the SCRI message for the PS domain to the BSS/RNC 505 in UTRAN or a universal mobile telecommunications system (UMTS) network in operation S540.

If the UE 501 receives, from the BSS/RNC 505, Layer 2 ACK to the SCRI message for the PS domain in operation 545, the UE 501 may operate a connection release timer (CRT) in operation S550. The CRT may allow the UE 501 to execute a transition to LTE within a determined time period. The CRT may correspond to a timer for designating a waiting time given for the RRC connection release.

During operation of the CRT, RRC connection release and RRC connection release complete may be performed in operations S555 and S560, respectively, and the UE 501 may execute a transition to the LTE network based on LTE system information in operation S570, if the RRC connection release message is received within the determined time period ('Case 1').

If the operations 555 and 560 are not normally performed until the CRT expires, the UE 501 may execute an RRC connection release in operation S565, and may execute a transition to the LTE network based on LTE system information in operation S570 ('Case 2'). In order to register in the LTE network again, the UE 501 may receive system information on E-UTRAN, establish random access channel (RACH) and RRC connection, and transmit RRC connection setup complete message. Further, the UE 501 may perform a combined TAU procedure, and resume a PS session on E-UTRAN. An example of the combined TAU procedure is described in 3GPP TS 23.272 V11.1.0 (2012-06): 3rd Generation Partnership Project; Technical Specification Group Services and System Aspects; Circuit Switched (CS) Fallback in Evolved Packet System (EPS); Stage 2 (Release 11), which is incorporated herein by reference in its entirety.

However, according to the fast return to LTE scheme, when a PS signaling connection exists after the termination of a CSFB call, the UE 501 transmits the SCRI message for a PS domain as described in operation S540 regardless of whether the UE is waiting for a response, e.g., a response for a routing area updating request. Even though the response for the routing area updating request is not received in a 3G network, transitioning to the LTE network triggered by transmitting the SCRI message and the subsequent processes illustrated in FIG. 4 are performed. Throughout the specification, the existence of a PS session or a PS signaling connection may refer to a state in which the PS session or the PS signaling is not released (i.e., the PS session is not closed). For example, if a PS signaling connection for a location registration of a terminal exists, the location registration of the terminal is not completed and further signaling between the terminal and counterpart core network may be performed to complete the location registration, e.g., routing area update.

Since a context about switching between RATs may not be exchanged successfully in the network, a procedure for location registration in the LTE network may fail (#10—IMPLIC- ITLY_DETACHED) and operation 430 of FIG. 4 may not be performed. As a result, an incoming and outgoing call failure and a data access delay may occur until the next location registration attempt and registration.

To address this issue, exemplary embodiments of the present invention provide a method for controlling a transmission time of a packet switched signaling connection release indication (PS SCRI) message based on a determination of whether a PS session for location registration is open and/or a PS session for data communication is open.

Figure 6:
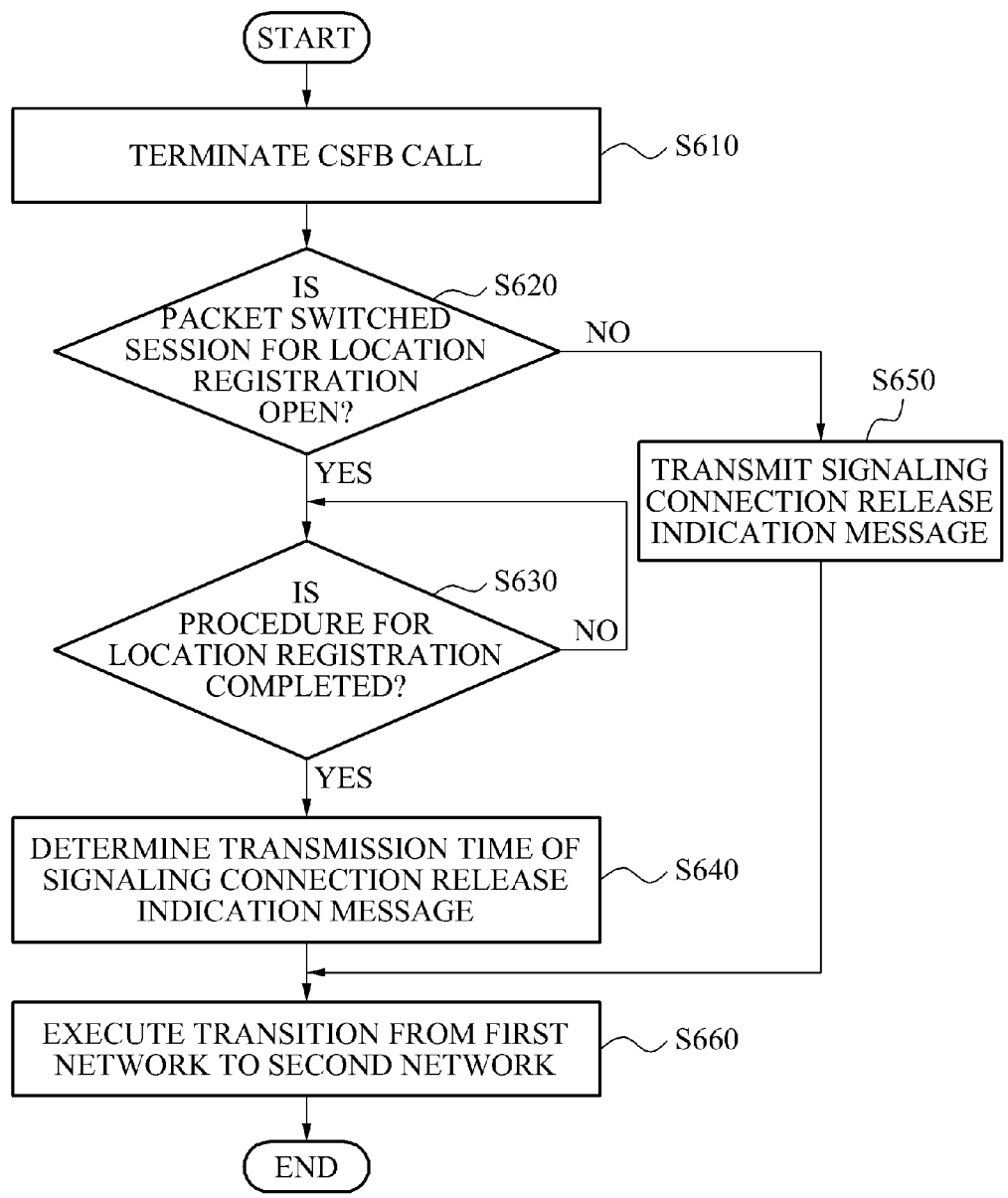
FIG. 6 is a flowchart illustrating a method for switching between radio access technologies (RATs) for a terminal according to an exemplary embodiment of the present invention.

FIG. 6 is a flowchart illustrating a method for switching between RATs for a terminal according to an exemplary embodiment of the present invention. A communication method of switching between RATs for a terminal in a communication system including a first network using a first RAT and a second network using a second RAT is described with reference to FIG. 6. The second network may comprise a packet switched network.

Referring to FIG. 6, after a CSFB call is terminated in operation S610, the terminal may verify whether a PS session for registering a location of the terminal is active in operation S620. Further, before verifying whether the PS session for registering the location of the terminal is open, the terminal may verify whether a PS session for data communication is open.

If it is verified that the PS session for registering the location of the terminal is open in operation S620, the terminal may verify whether a procedure for location registration is completed in operation S630. The procedure for location registration may include a procedure for registering the location of the terminal in the first network by switching from the second RAT to the first RAT, and a procedure for registering a new location of the terminal in the first network by changing a routing area code (RAC) during a call processing procedure. The change of the RAC may include a change of a routing area caused by movement of the terminal. The first network may include the WCDMA network, and the second network may include the LTE network, for example.

If it is verified that the PS session for registering the location of the terminal is absent in operation S620, the terminal may transmit an SCRI message to the first network in operation S650, and may execute a transition from the first network to the second network in operation S660.

In operation S640, the terminal may determine a transmission time of the SCRI message for closing the PS session based on the verified result in operation S630. The terminal may determine the transmission time of the SCRI message based on the determination of whether the procedure for location registration is completed.

Further, the terminal may determine whether to perform closing of the PS session based on the determination of whether the procedure for location registration is completed. If the procedure for location registration is completed and the PS session for data is open, the terminal may determine to perform closing of the PS session. If it is determined that closing of the PS session is to be performed, the terminal may transmit the SCRI message to the first network.

If it is determined not to perform closing of the PS session, the terminal may execute a transition from the first network to the second network using the second RAT system information obtained before setting up a CSFB call in operation S660.

Figure 7A:
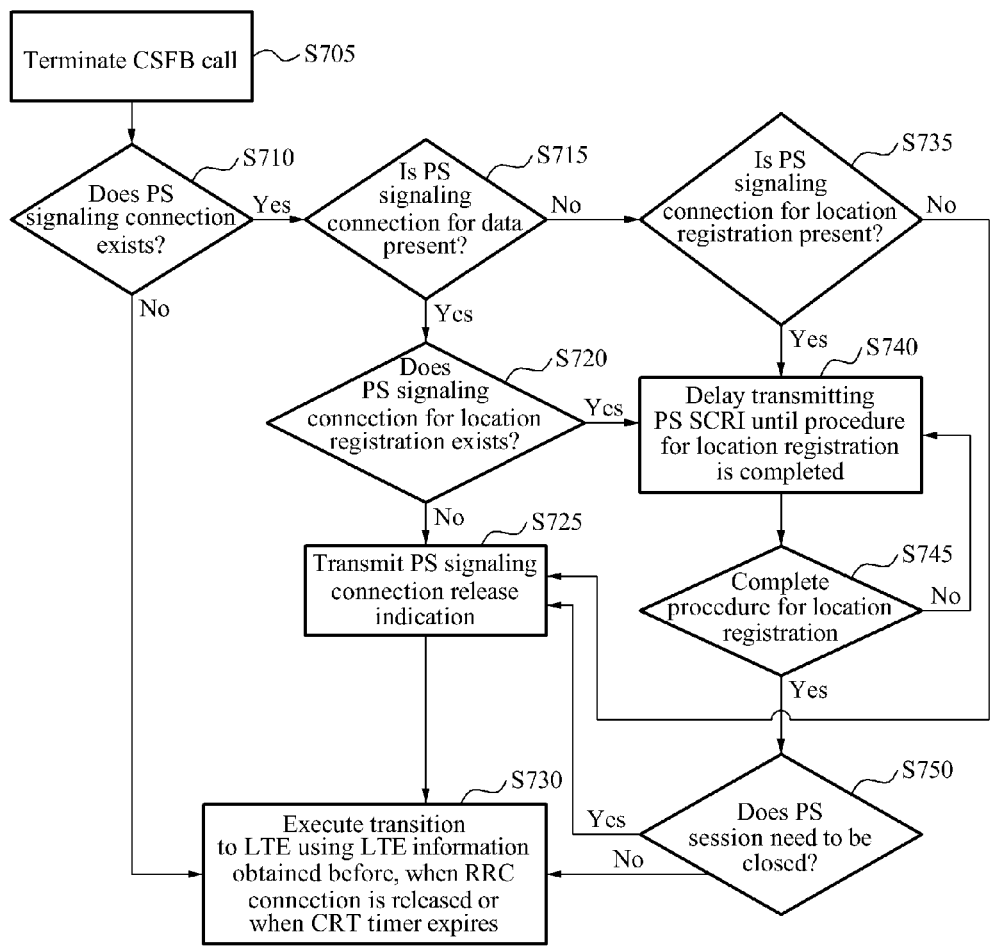
FIG. 7A is a diagram illustrating a method for switching between RATs for a terminal according to an exemplary embodiment of the present invention.

FIG. 7A is a diagram illustrating a method for switching between RATs for a terminal according to an exemplary embodiment of the present invention.

'PS signaling connection' mentioned herein may represent an existence of an active PS session including a series of procedures for processing a data communication through a PS domain and/or a series of procedures for location registration.

Further, the 'procedure for location registration' may include a procedure for registering a location in a first network, e.g., a 3G network, by enabling fallback from a second network, e.g., an LTE network, to the first network for switching between RATs, and a procedure for registering a location by changing an RAC as described in operation S370 of FIG. 3. The change of the RAC may include a change of a routing area caused by a movement of the terminal while the 3G call is connected.

Referring to FIG. 7A, if a CSFB call is terminated in operation S705, the terminal may verify whether a PS session is open in operation S710. The determination of whether the PS session is open may be verified based on a determination of whether a PS signaling connection message is transmitted.

If the CSFB call is terminated, the terminal may verify whether a PS signaling connection message is communicated in operation S710. If the PS signaling connection message is absent, the terminal may wait for RRC connection release or wait for the expiration of CRT and may execute a transition to an LTE network using LTE information obtained before if the RRC connection is released or the CRT is expired in operation S730.

If it is verified that the PS signaling connection message is communicated and the PS signaling connection exists in operation S710, the terminal may verify whether the PS session for data communication, a PS signaling connection message for data communication, exists in operation S715.

If the PS signaling connection message for data exists in operation S715, the terminal may request closing of the PS session. In such instance, the terminal may request the closing of the PS session regardless of whether a procedure for location registration is performed.

If transitioning to the LTE network is executed in a state where the procedure for location registration is not completed in 3G/2G network, operation 430 illustrated in FIG. 4 may fail during location registration illustrated in FIG. 1 and FIG. 2.

To address this issue, if the PS session for data exists in operation S715, the terminal may verify whether a PS session for location registration, a PS signaling connection message for location registration, exists, before closing the PS session, in operation S720. Further, if the PS session is open and the PS signaling connection message for data is absent in operation S715, the terminal may verify whether the PS signaling connection message for location registration exists in operation S735.

If the PS signaling connection message for location registration is absent in operation S720, the terminal may transmit, to the network, a PS SCRI message indicating the closing of the PS session to close the PS session for a fast return to LTE in operation S725. The terminal may perform the fast return to LTE based on operations S550, S555, S560, S565, and S570 illustrated in FIG. 5.

That is, if the RRC connection is released or the CRT expires, the terminal may execute a transition to an LTE network in operation S730.

For example, transmission of the PS SCRI message by the terminal may correspond to processing of operation S540 of FIG. 5, and if the terminal receives Layer 2 ACK in response to the SCRI message in operation S545 of FIG. 5, the terminal may operate the CRT.

Before the CRT expires, if the terminal receives an RRC connection release message from, for example, a BBS/RNS and transmits an RRC connection release complete message to the BBS/RNS in response to the RRC connection release message, the RRC connection may be released and the terminal may execute a transition to the LTE network. The RRC connection release may correspond to the close of CS and PS sessions.

If the RRC connection is not released until the CRT expires, the terminal may release the RRC connection and execute a transition to the LTE network after the CRT expires.

If the PS signaling connection message for data is absent in operation S715, the terminal may verify whether the PS signaling connection for location registration exists in operation S735. If the PS signaling connection for location registration exists, e.g., the procedure for location registration is not completed, the terminal may not transmit the PS SCRI message and may wait until the procedure for location registration is completed in operation S740.

The terminal may verify whether the procedure for location registration is completed in operation S745.

If it is verified that the procedure for location registration is not completed in operation S745, the terminal may perform the operation S740 again and may not transmit the PS SCRI message and may wait until the procedure for location registration is completed.

If it is verified that the procedure for location registration is completed in operation S745, the terminal may determine whether to perform closing of the PS session in operation S750.

If the procedure for location registration is completed and data communication is not active, the network may perform the signaling connection release for the PS domain, and the terminal may not transmit the PS SCRI message. However, if the PS session for data is open, since the terminal may not execute a transition to LTE, the terminal may determine whether to transmit the PS SCRI message. Thus, the terminal may determine again whether to request closing of the PS session by transmitting the PS SCRI message in operation S750.

The terminal may determine whether to transmit the SCRI message for the PS domain after termination of the CSFB call based on a PS session status in the connected network. In order to determine the PS session status, the terminal may verify whether the PS session for data is open and/or whether the PS session for location registration is open. Further, if the PS signaling connection for location registration exists, the terminal may defer transmitting the PS SCRI message. If the PS session is open at the completion time of location registration, the terminal may transmit the PS SCRI message.

If the PS session is closed according to instructions of the network, the terminal may not transmit the PS SCRI message and wait for RRC connection release since the PS session is already closed. Further, if processing of the RRC connection release message is completed, the terminal may execute a transition to an LTE network using LTE system information obtained before, even though the terminal is not provided with LTE redirection information.

The fast return to LTE scheme may provide a process for switching the RAT from the 3G network to the LTE network after the CSFB call is terminated without considering specific PS session status and transmission of the PS signaling connection message. Since processing of the PS signaling connection release message is performed in the consideration of a PS session for data communication only and location registration for the PS domain is not considered, the aforementioned problems and issues may occur in the fast return to LTE scheme.

However, according to the exemplary embodiment of the present invention, since the terminal may verify whether the PS session for data is open and/or whether the PS session for location registration is open and may transmit the SCRI message for the PS domain based on the verified result, the terminal may execute a transition to the LTE network more stably and faster than a terminal without the fast return to LTE function.

Hereinafter, operations will be described in further detail.

If a CSFB call is terminated in operation S705, the terminal may verify whether a PS signaling connection exists in operation S710. If the PS signaling connection is absent, the terminal may wait for RRC connection release, and if the RRC connection is released, the terminal may execute a transition to the LTE network using LTE information obtained before in operation S730.

As described above, if the PS session is closed without considering whether a procedure for location registration is performed, location registration failures may occur during a registration in the LTE network. That is, since transitioning to the LTE network may be executed in a state where a procedure for location registration is not completed in a 3G/2G network, operation S430 of FIG. 4 may fail during location registration to the LTE network.

If it is determined that the PS signaling connection exists in operation S710, the terminal may verify whether a PS session for data exists in operation S715. If the PS session for data exists, the terminal may verify whether a PS signaling connection for location registration exists before closing the PS session in operation S720.

Further, if it is determined that the PS signaling connection for data is absent in operation S715, the terminal may verify whether a PS signaling connection for location registration exists in operation S735.

If it is determined that the PS signaling connection for location registration exists in operation S735, the terminal may not transmit a PS SCRI message and may wait until the procedure for location registration is completed in operation S740. If it is determined that the PS signaling connection for location registration is absent in operation S735, the terminal may transmit the PS SCRI message in operation S725.

The operation S725 may correspond to an operation in which the terminal transmits the PS SCRI message to the network to close the PS session for the fast return to LTE.

If the terminal transmits the PS SCRI message in operation S725, the terminal may wait for Layer 2 ACK in response to the PS SCRI message, and, if the terminal receives the Layer 2 ACK, the terminal may operate a CRT in operation S730. If the RRC connection is released before the CRT expires, the terminal may execute a transition to an LTE network using LTE system information obtained before. The LTE system information may be obtained before the connection to the circuit switched network, e.g., 3G/2G network. If the RRC connection is not released until the CRT expires, the terminal may release the RRC connection without receiving RRC connection release message and execute a transition to the LTE network.

If the PS signaling connection for location registration is not completed, the terminal may repeatedly perform operation S740 and operation S745. The terminal may not transmit the PS SCRI message and may wait until the procedure for location registration is completed, and may verify whether the procedure for location registration is completed. If the procedure for location registration to the 3G/2G network is not completed, the terminal may perform the operation S740 again while deferring transmitting the PS SCRI message. If the procedure for location registration is completed, the terminal may perform operation S750.

If the procedure for location registration is completed and data communication is not activated in operation S745, the network may instruct the terminal to release the signaling connection for the PS domain, and the terminal may not transmit the PS SCRI message since PS sessions are closed. If the PS session for data exists, the terminal may not execute the transition to the LTE network immediately. In order to determine whether to transmit the PS SCRI message, the terminal may determine again whether to perform closing of the PS session or to wait normal PS session closing in operation S750. If it is determined that the PS signaling connection for data needs to be closed in operation S750, the terminal may perform operation S725. However, if it is determined that the PS signaling connection for data does not have to be closed, the terminal may perform operation S730 to attempt an immediate transition to the LTE network.

Figure 7B:
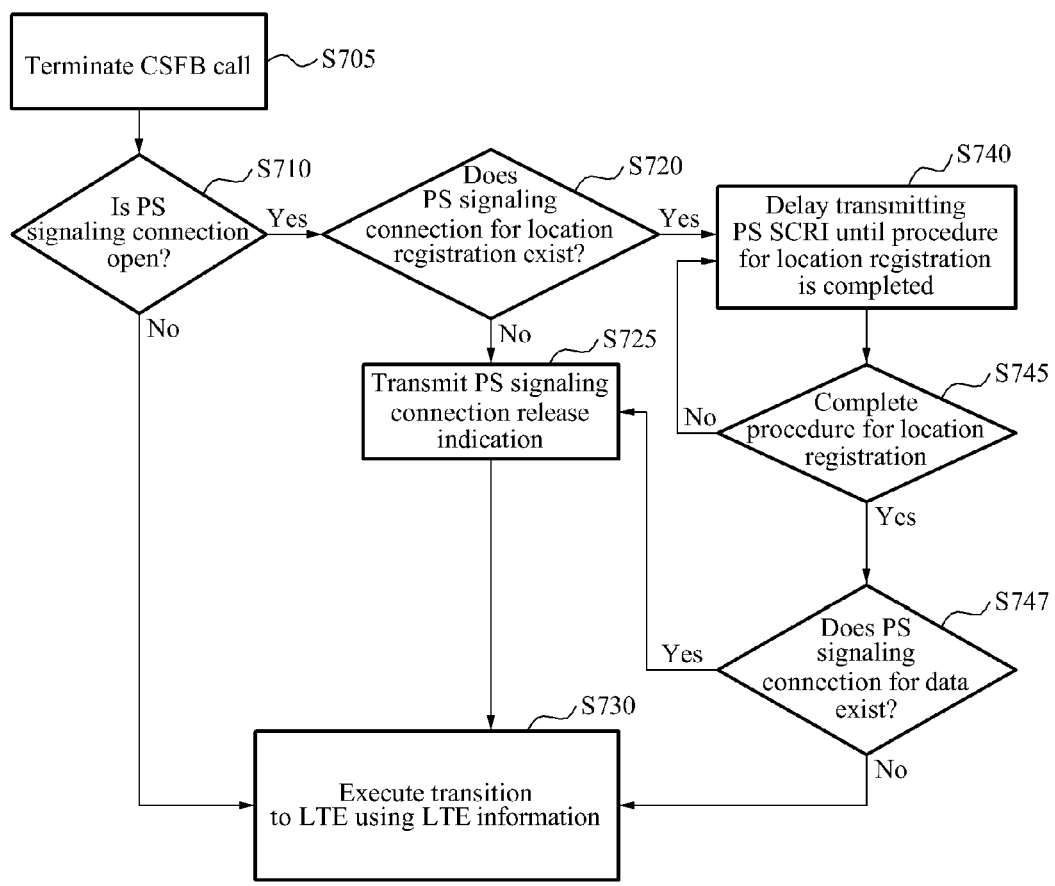
FIG. 7B and FIG. 7C are diagrams illustrating a method for switching between RATs for a terminal according to an exemplary embodiment of the present invention.
Figure 7C:
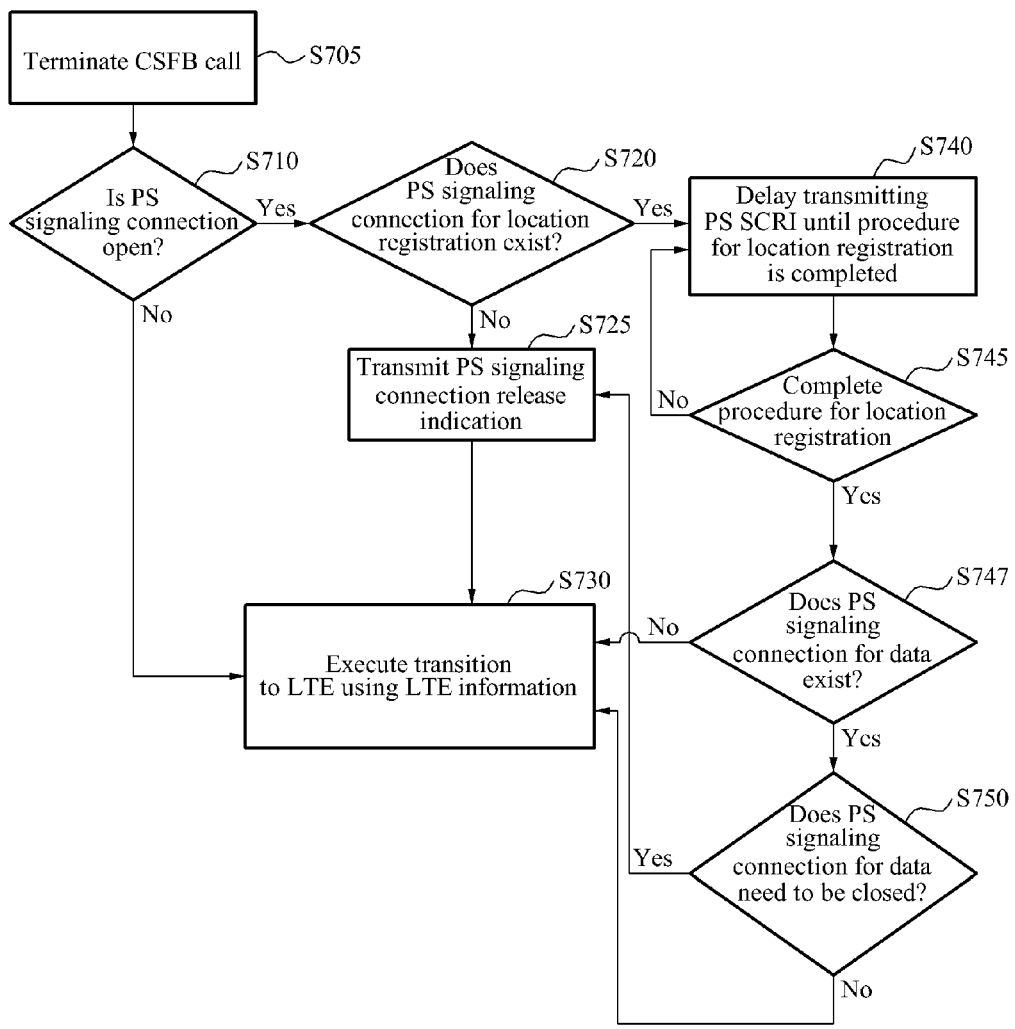

FIG. 7B and FIG. 7C are diagrams illustrating a method for switching between RATs for a terminal according to exemplary embodiments of the present invention. Referring to FIG. 7B and FIG. 7C, a terminal may process and terminate a call, e.g., a CSFB call, in operation S705. In operation S710, the terminal may determine whether a PS signaling connection is open. If it is determined that a PS signaling connection is open, the terminal may determine whether a PS signaling connection for location registration exists in operation S720. If it is determined that a PS signaling connection is not open as determined in operation S710, the terminal may perform transition into LTE network using LTE information in response to a receipt of an RRC connection release message from a 3G/2G network or in response to an expiration of CRT timer in operation S730. In operation S720, the terminal may determine whether a PS signaling connection for location registration exists, e.g., Routing Area Update signaling. If it is determined that the PS signaling connection for location registration does not exist as determined in operation S720, the terminal may transmit a PS SCRI message to the 3G/2G network in operation S725 and may perform operation S730. If it is determined that the PS signaling connection for location registration exists as determined in operation S720, the terminal may defer the transmission of the PS SCRI in operation S740 until the procedure of the location registration is completed and the PS signaling connection for location registration is closed in operation S745. If it is determined that the procedure of the location registration is completed in operation S745, the terminal may determine whether a PS signaling connection for data exists other than the PS signaling connection for location registration in operation S747.

Referring to FIG. 7B, if a PS signaling connection for data exists as determined in operation S747, the terminal may perform operation S725 to request closing of the PS signaling connection for data for fast return to LTE. If the PS signaling connection for data does not exist as determined in operation S747, the terminal may perform the transition into LTE network using LTE information without waiting for an RRC connection release message or a CRT timer expiration in operation S730. Further, if the PS signaling connection for data does not exist as determined in operation S747, the terminal may perform the transition into LTE network using LTE information in response to a receipt of an RRC connection release message from a 3G/2G network or in response to an expiration of a timer started after the completion of the procedure for location registration in operation S730.

Referring to FIG. 7C, if a PS signaling connection for data exists as determined in operation S747, the terminal may determine whether to perform closing of the PS signaling connection for data in operation S750. The determination in operation S750 may be performed based on a type of PS signaling connection for data. If the terminal determines to perform closing of the PS signaling connection for data as determined in operation S750, the terminal may perform operation S725. If the terminal determines not to perform closing of the PS signaling connection for data as determined in operation S750, the terminal may perform transition into LTE network using LTE information without waiting for an RRC connection release message or a CRT timer expiration in operation S730.

Figure 8:
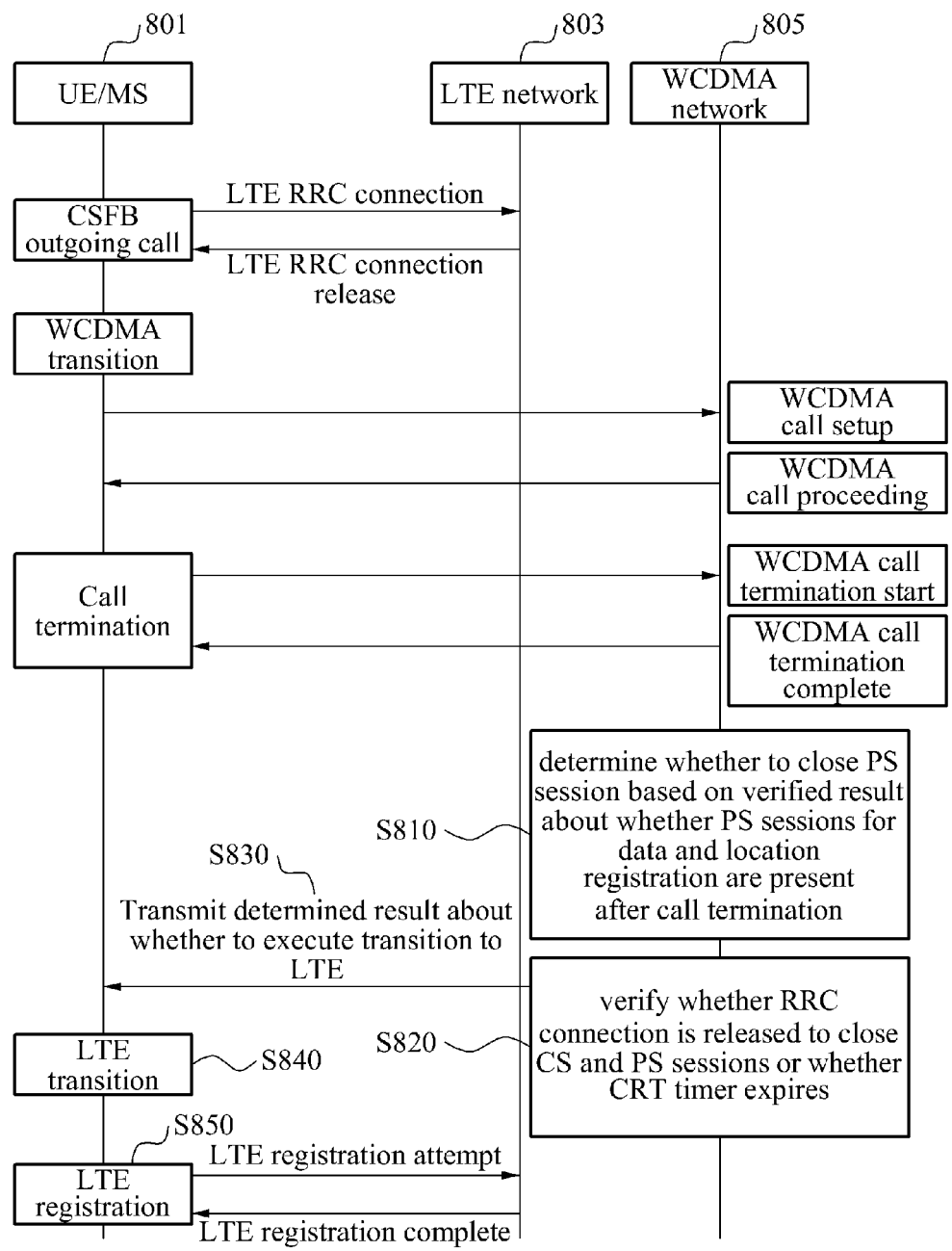
FIG. 8 is a diagram illustrating a process of a CSFB call processing with a conditional fast return to LTE function based on a packet switched session status according to an exemplary embodiment of the present invention.

FIG. 8 is a diagram illustrating a process of a CSFB call processing with a conditional fast return to LTE function based on a packet switched session status according to an exemplary embodiment of the present invention.

Referring to FIG. 8, in operation S810, after a call is terminated, UE/MS 801 may verify whether a PS session for data is open and whether a PS session for location registration is open, and may determine whether to transmit a PS SCRI message based on the verified result. The 'PS SCRI' message may correspond to a message transmitted to the network to close the PS session. The UE/MS 801 may be referred to as a terminal or a mobile terminal.

In operation S820, the UE/MS 801 may determine whether to execute a transition to an LTE network based on a determination whether the PS session is closed. The terminal may verify whether an RRC connection is released, e.g., whether CS and PS sessions are closed, or whether a CRT expires. The UE/MS 801 may start CRT if the UE/MS 801 transmits the SCRI or the UE/MS 801 receives Layer 2 acknowledgement (ACK). If the UE/MS 801 fails to receive Layer 2 acknowledgement (ACK) or RRC connection release message from the network until the CRT expires, the UE/MS 801 may release the RRC connection in order to perform transitioning to the LTE network using a conditional fast return to LTE function. The conditional fast return to LTE scheme is conditional since the UE/MS 801 determines the fast return depending upon one or more criteria, e.g., PS session for location registration status and the UE/MS 801 controls the transmission of the SCRI.

If the terminal receives a determination result about transitioning to the LTE network from the 3G/2G network, the terminal may execute a transition to the LTE network in operation S840, and may execute an LTE registration in operation S850.

Figure 9:
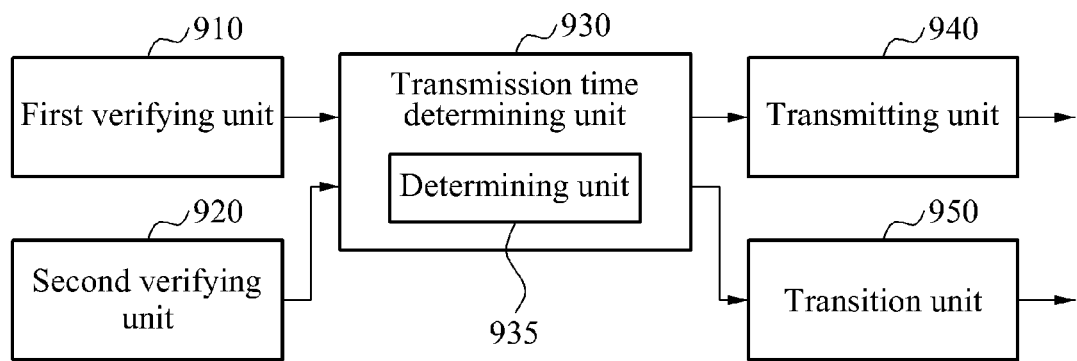
FIG. 9 is a block diagram illustrating a terminal for switching between RATs according to an exemplary embodiment of the present invention.

FIG. 9 is a block diagram illustrating a terminal for switching between RATs according to an exemplary embodiment of the present invention. Referring to FIG. 9, the terminal for switching between RATs in a communication system including a first network using a first RAT and a second network using a second RAT may include a first verifying unit 910, a second verifying unit 920, a transmission time determining unit 930, a transmitting unit 940, and a transition unit 950. The first RAT may include, for example, WCDMA, and the second RAT may include, for example, an LTE network. The terminal may include one or more processors, memories, wireless communication modem chips, antennas, and the like to implement operations performed by the first verifying unit 910, the second verifying unit 920, the transmission time determining unit 930, the transmitting unit 940, and/or the transition unit 950

The first verifying unit 910 may verify whether a PS session for registering a location of the terminal exists if a call of a CSFB for switching between the RATs is terminated.

The first verifying unit 910 may verify whether a procedure for registering the location is completed. Here, the procedure for registering the location may include a procedure for registering the location of the terminal in the first network after switching from the second RAT to the first RAT, and a procedure for registering a new location of the terminal in the first network by changing an RAC in a state in which the call is connected. The change of the RAC may include a change of a routing area caused by a movement of the terminal while the 3G network call is connected.

The second verifying unit 920 may verify whether a PS session for data exists.

The transmission time determining unit 930 may determine, based on the verified result of the first verifying unit 910 and/or the second verifying unit 920, a transmission time of an SCRI message for closing the PS session The transmission time determining unit 930 may determine the transmission time of the SCRI message based on a determination of whether the procedure for registering the location is completed.

Further, the transmission time determining unit 930 may include a determining unit 935 to determine whether to perform closing of the PS session based on whether the procedure for registering the location is completed. If the procedure for registering the location is completed and the PS session for data communication exists, the determining unit 935 may determine to perform the closing of the PS session. Further, the determining unit 935 may determine whether to perform the closing of the PS session according to a type of the PS session for data other than the PS session for registering the location.

The transmitting unit 940 may transmit the SCRI message if it is determined to perform the closing of the PS session.

The transition unit 950 may execute a transition from the first network to the second network using the second RAT system information obtained before setting up the CSFB call if it is determined that closing of the PS session is not necessary.

The exemplary embodiments of the present invention may be recorded in non-transitory computer-readable media including program instructions to implement various operations embodied by a computer. The media may also include, alone or in combination with the program instructions, data files, data structures, and the like. The media and program instructions may be those specially designed and constructed for the purposes of the present invention, or they may be of the kind well-known and available to those having skill in the computer software arts. Examples of non-transitory computer-readable media include magnetic media such as hard discs, floppy discs, and magnetic tape; optical media such as CD ROM discs and DVD; magneto-optical media such as floptical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention.

According to the exemplary embodiments, a terminal may determine, based on a verification result about whether a PS session for registering a location of the terminal exists, a transmission time of an SCRI message for closing the PS session, thereby preventing an incoming and outgoing call failure and a data access delay that may occur when releasing a PS signaling connection.

According to the exemplary embodiments, a terminal may determine, based on a determination whether a procedure for registering a location of the terminal is completed, a transmission time of an SCRI message, so that the terminal may execute a stable and fast transition to an LTE network regardless of whether the terminal is provided with LTE redirection information from a releasing network.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A method for switching between radio access technologies (RATs) for a terminal, comprising:
    determining whether a packet switched (PS) signaling connection is released, the PS signaling connection being associated with a first network corresponding to a first radio access technology (RAT);
    controlling a switching timing to a second network corresponding to a second RAT according to a type of the PS signaling connection, the controlling of the switching timing comprises:
        in response to a determination that a PS signaling connection for registering a location of the terminal is not released, waiting for a completion of the PS signaling connection for registering a location of the terminal and deferring a transmission time of a signaling connection release indication (SCRI) message for closing the PS signaling connection associated with the first network corresponding to the first RAT; and
    transmitting a request for switching to the second network.

2. The method of claim 1, wherein the first network comprises a circuit switched network and a packet switched network, and the second network comprises a packet switched network.

3. The method of claim 1, further comprising: terminating a circuit switched fallback (CSFB) call processed with the first network,
    wherein the determination of whether the PS signaling connection is released is performed in response to the termination of the CSFB call.

4. The method of claim 1, wherein:
    the type of the PS signaling connection comprises the PS signaling connection for registering a location of the terminal and a second PS signaling connection different from the PS signaling connection for registering a location of the terminal; and
    the controlling of a switching timing comprises transmitting a SCRI message for closing the second PS signaling connection without waiting for a completion of the second PS signaling connection.

5. The method of claim 4, wherein the PS signaling connection for registering a location of the terminal comprises a Routing Area Update (RAU) initiated during a circuit switched fallback (CSFB) call processed with the first network.

6. The method of claim 1, wherein the controlling of a switching timing comprises controlling a transmission time of a signaling connection release indication (SCRI) message for closing the PS signaling connection.

7. The method of claim 6, wherein the transmitting of a request for switching to the second network is performed in response to a receipt of a Radio Resource Control (RRC) connection release message or in response to an expiration of a connection release timer.

8. The method of claim 7, further comprising receiving a Layer 2 Acknowledgement in response to the SCRI,
    wherein the connection release timer starts after transmitting the SCRI or receiving the Layer 2 Acknowledgement.

9. The method of claim 1, wherein the controlling of a switching timing comprises deferring an RRC connection release in response to the determination that the PS signaling connection for registering a location of the terminal is not released.

10. A method for switching between radio access technologies (RATs) for a terminal, comprising:
    determining a status of a packet switched (PS) signaling connection associated with a first network corresponding to a first radio access technology (RAT);
    controlling a transmission time of a signaling connection release indication (SCRI) message to the first network, the controlling of the transmission time comprises:
        in response to a determination that a PS signaling connection for registering a location of the terminal is not released, waiting for a completion of the PS signaling connection for registering a location of the terminal and deferring a transmission time of the signaling connection release indication (SCRI) message for closing the PS signaling connection; and
        in response to a determination that a second PS signaling connection different from the PS signaling connection for registering a location of the terminal is not released, transmitting a SCRI message for closing the second PS signaling connection without waiting for a completion of the second PS signaling connection; and
    transmitting a request for switching to a second network corresponding to a second RAT depending upon the transmission of the SCRI message for closing the PS signaling connection associated with the first network corresponding to the first RAT.

11. The method of claim 10, wherein the PS signaling connection for registering a location of the terminal comprises a Routing Area Update (RAU) initiated during a CSFB call processed with the first network.

12. The method of claim 10, wherein the transmitting of a request for switching to the second network is performed in response to a receipt of a Radio Resource Control (RRC) connection release message or in response to an expiration of a connection release timer.

13. The method of claim 12, further comprising receiving a Layer 2 Acknowledgement in response to the SCRI message for closing the PS signaling connection associated with the first network corresponding to the first RAT,
    wherein the connection release timer starts after transmitting the SCRI message for closing the PS signaling connection associated with the first network corresponding to the first RAT or receiving the Layer 2 Acknowledgement.

14. A terminal for switching between radio access technologies (RATs), comprising:
    a controller to determine whether a packet switched (PS) signaling connection is released, the PS signaling connection being associated with a first network corresponding to a first radio access technology (RAT), and to control a switching timing to a second network corresponding to a second RAT according to a type of the PS signaling connection; and
    a transmitter to transmit a request for switching to the second network,
    wherein, in response to a determination that a PS signaling connection for registering a location of the terminal is not released, the controller waits for a completion of the PS signaling connection for registering a location of the terminal and defers a transmission time of a signaling connection release indication (SCRI) message for closing the PS signaling connection associated with the first network corresponding to the first RAT.

15. The terminal of claim 14, wherein the controller terminates a circuit switched fallback (CSFB) call processed with the first network, and
wherein the determination of whether the PS signaling connection is released is performed in response to the termination of the CSFB call.

16. The terminal of claim 14, wherein the PS signaling connection for registering a location of the terminal comprises a Routing Area Update (RAU) initiated during a CSFB call processed with the first network.

17. The terminal of claim 14, wherein the controller controls a transmission time of a signaling connection release indication (SCRI) message for closing the PS signaling connection to control the switching time.

18. The terminal of claim 14, wherein the controller defers an RRC connection release in response to a determination that a PS signaling connection for registering a location of the terminal is not released.

19. The terminal of claim 14, wherein:
the type of the PS signaling connection comprises the PS signaling connection for registering a location of the terminal and a second PS signaling connection different from the PS signaling connection for registering a location of the terminal; and
the controller transmits a SCRI message for closing the second PS signaling connection without waiting for a completion of the second PS signaling connection.

* * * * *